US006829719B2

(12) United States Patent
Anvin et al.

(10) Patent No.: US 6,829,719 B2
(45) Date of Patent: Dec. 7, 2004

(54) METHOD AND APPARATUS FOR HANDLING NESTED FAULTS

(75) Inventors: H. Peter Anvin, San Jose, CA (US); David Keppel, Seattle, WA (US)

(73) Assignee: Transmeta Corporation, Santa Clara, CA (US)

( * ) Notice: Subject to any disclaimer, the term of this patent is extended or adjusted under 35 U.S.C. 154(b) by 449 days.

(21) Appl. No.: 09/822,933

(22) Filed: Mar. 30, 2001

(65) Prior Publication Data

US 2002/0144184 A1 Oct. 3, 2002

(51) Int. Cl.[7] .................................................. G06F 11/00
(52) U.S. Cl. .............................. 714/2; 714/38; 712/244; 710/260
(58) Field of Search .............................. 714/15, 2, 38; 712/228, 244; 710/260, 264

(56) References Cited

U.S. PATENT DOCUMENTS

| | | | | |
|---|---|---|---|---|
| 3,614,740 A | * | 10/1971 | Delagi et al. | 712/228 |
| 5,386,563 A | * | 1/1995 | Thomas | 712/228 |
| 5,481,719 A | * | 1/1996 | Ackerman et al. | 709/108 |
| 5,588,113 A | * | 12/1996 | Johnson | 714/15 |
| 5,944,816 A | * | 8/1999 | Dutton et al. | 712/215 |
| 6,691,250 B1 | * | 2/2004 | Chandiramani et al. | 714/25 |
| 2001/0047470 A1 | * | 11/2001 | Roche | 712/244 |
| 2002/0144099 A1 | * | 10/2002 | Muro et al. | 712/228 |

* cited by examiner

*Primary Examiner*—Robert Beausoliel
*Assistant Examiner*—G. Chu

(57) ABSTRACT

Apparatus and a method for handling nested faults including the steps of determining whether a fault is a first level fault, responding to a determination of a first level fault by saving a first amount of state sufficient to handle a first level fault, and responding to a determination of a nested fault by saving an additional amount of state before handling the fault.

14 Claims, 3 Drawing Sheets

METHOD AND APPARATUS FOR HANDLING NESTED FAULTS

BACKGROUND OF THE INVENTION

1. Field Of The Invention

This invention relates to computer systems and, more particularly, to a method and apparatus by which a computer processor handles nested faults.

2. History Of The Prior Art

A computer processor continually encounters circumstances in which it must halt the processing of a particular sequence of instructions to attend to some occurrence not usually encountered in the sequence. These occurrences are variously referred to as errors, exceptions, faults, and other terms which are often defined differently by different parties and under different circumstances. In general, such occurrences all require the processor to halt the sequence of instructions it is presently processing and take some action outside of the execution of the interrupted sequence.

As one example, an error in executing a particular sequence may require that the processor stop the execution, discard the results generated to that point, and move back to an earlier point in the sequence to begin reexecution. On the other hand, an interrupt may be generated by a modem signaling that data is arriving from circuitry external to the computer that is executing the sequence. Such an interrupt may require the processor to stop execution of the sequence, receive the externally provided data, and then return to executing the sequence at the point at which it was stopped. There are many other situations in which a processor must halt its processing in order to attend to matters outside of the execution of an executing sequence, and all are subject to a number of the some of the same difficulties. Because there are many different situations, in this specification, the use of each of the terms fault, exception, error, and the like is intended to encompass all of these terms except where otherwise stated or made obvious from the text.

In prior art processors, the typical method of handling exceptions is to interrupt the sequence of instructions being executed, save enough information about the sequence and its execution up to its interruption to be able to return to the sequence and continue its execution, then transfer control of the processor to a software sequence of instructions for handling the exception (usually referred to as an exception handler), execute the exception handler to handle whatever needs be done to take care of the exception, retrieve the information about the interrupted sequence and its execution up to its interruption, and recommence execution of the interrupted sequence of instructions. Of course, in many situations, the exception will be such that the interrupted sequence cannot or should not continue so that the processor will be directed to some other sequence of instructions by the handler.

An exception or fault handler is typically a sequence of instructions stored by the computer which have been devised to carry out the processes necessary to service the particular interruption. For example, if a page fault occurs signaling that the data necessary for execution of a sequence of instructions is not in system memory, then the fault handler software to which the processor is referred is adapted to find the necessary information in long term memory and return a copy to system memory so that execution of the sequence may continue. If an interrupt signals that a modem is receiving external data which must be transferred to the computer essentially without interruption, then the fault handler software is adapted to see that all of the external data is received and stored without interference from the interrupted sequence of instructions.

Because such fault handlers are adapted to handle significantly different problems, they vary significantly from one to the next. However, since fault handlers are sequences of instructions which must be executed, these sequences are themselves subject to interruption by faults, exceptions, and the like. Consequently, it is possible to have what are typically referred to as nested faults, situations in which a fault handler is executing and itself is interrupted for some reason. Because such situations can occur, it is necessary to provide for their occurrence.

A primary difficulty is handling nested faults arises in saving sufficient information (state) so that the processor will be able to return after handling each of the levels of faults to the proper place in execution so that it may continue execution of the last interrupted sequence of instructions whether that sequence be typical code or fault handling code. Presuming that a nested fault occurs while servicing a first level fault, it is necessary that the processor before handling the nested fault save both state sufficient to return to the first level fault once the nested fault has been handled and state sufficient to return from the first level fault to the proper place in execution of the last interrupted sequence of instructions.

Prior art fault handling processes have typically accomplished this in one of two ways. According to a first method, the processor hardware is designed to save sufficient state to return from any level of nested fault the processor might possibly encounter and restart any faulting sequence. To do this, the processor responds to any fault at any level by storing sufficient state for whatever level of fault may later occur. Fault handling hardware is quite complicated. The need to save state for a number of levels of faults has further complicated and slowed the process of fault handling.

A second prior art resolution of the problem has been to provide hardware which does not save state on each fault and restore state on any return from fault. Such hardware is able to handle first level faults since the instruction at which the fault occurred is retained, by the processor but is not capable of handling nested faults by itself. To handle nested faults, such hardware is utilized with software fault handlers which include code for saving and restoring state necessary to handle any level of fault which might occur. This second method simplifies hardware fault handlers since only state necessary to return from a first level fault need be saved. However, the method requires much more complicated software fault handlers written to provide the extra steps necessary to handle or eliminate nested faults. These extra steps may be those necessary for saving and restoring state necessary to handle any level of fault which might occur. Alternatively, these extra steps may be steps necessary to preclude a nested fault from occurring. For example, steps to eliminate a nested page fault might reorder the instruction sequence so that the missing page is in memory before the attempt to access memory occurs. Should a nested fault occur, then the fault handler treats the fault as fatal and directs the processor to utilize the steps provided by this additional system software to eliminate the nested fault.

It is desirable to provide circuitry and processes by which a processor may accomplish fault handling more expeditiously than by any of these prior art techniques.

SUMMARY OF THE INVENTION

It is, therefore, an object of the present invention to enhance the operation of a microprocessor by providing improved methods and circuitry for accomplishing fault handling.

This and other objects of the present invention are realized by apparatus and a method for determining whether a fault is a first level fault, responding to a determination of a first level fault by saving a first amount of state sufficient to handle a first level fault, and responding to a determination of a nested fault by saving an additional amount of state before handling the fault.

These and other objects and features of the invention will be better understood by reference to the detailed description which follows taken together with the drawings in which like elements are referred to by like designations throughout the several views.

DETAILED DESCRIPTION

The present invention improves the prior art approach to handling nested faults. The invention is based on the appreciation of the difference in the amount of state which must necessarily be saved in order to handle a first level fault and the amount of state which must be saved to handle nested faults.

Figure 1:
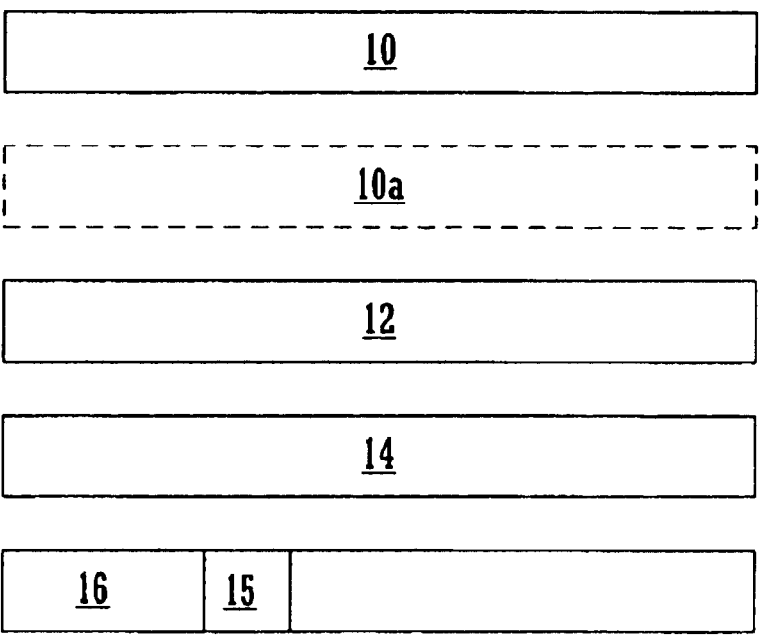
FIG. 1 is a diagram illustrating circuit elements utilized by the methods of FIGS. 2 and 3.

For example, processors typically utilize a register (such as an error program control register 10 illustrated in FIG. 1) to record the address of the instruction of the interrupted sequence to which to return after handling the fault and other state of the processor at the point of interruption. Processors also utilize fault handling registers 12 and 14 to store information used during the process of executing a fault handler. This information is used by the fault handler to execute the fault handling process. When a first level fault occurs, the information regarding the interrupted sequence is stored in the error program control register 10. However, the fault handling registers 12 and 14 hold no useful information; consequently, a first level fault handler need not save the contents of the fault handling registers since such information is not useful to the processor once execution returns from the first level fault to the sequence which was interrupted. On the other hand, if a nested fault occurs during execution of a fault handler, the data in the fault handling registers 12 and 14 must be saved before executing the instructions for handling the nested fault so that the first level fault handler may use this data in resolving the first level fault when execution returns from the nested fault.

Figure 2:
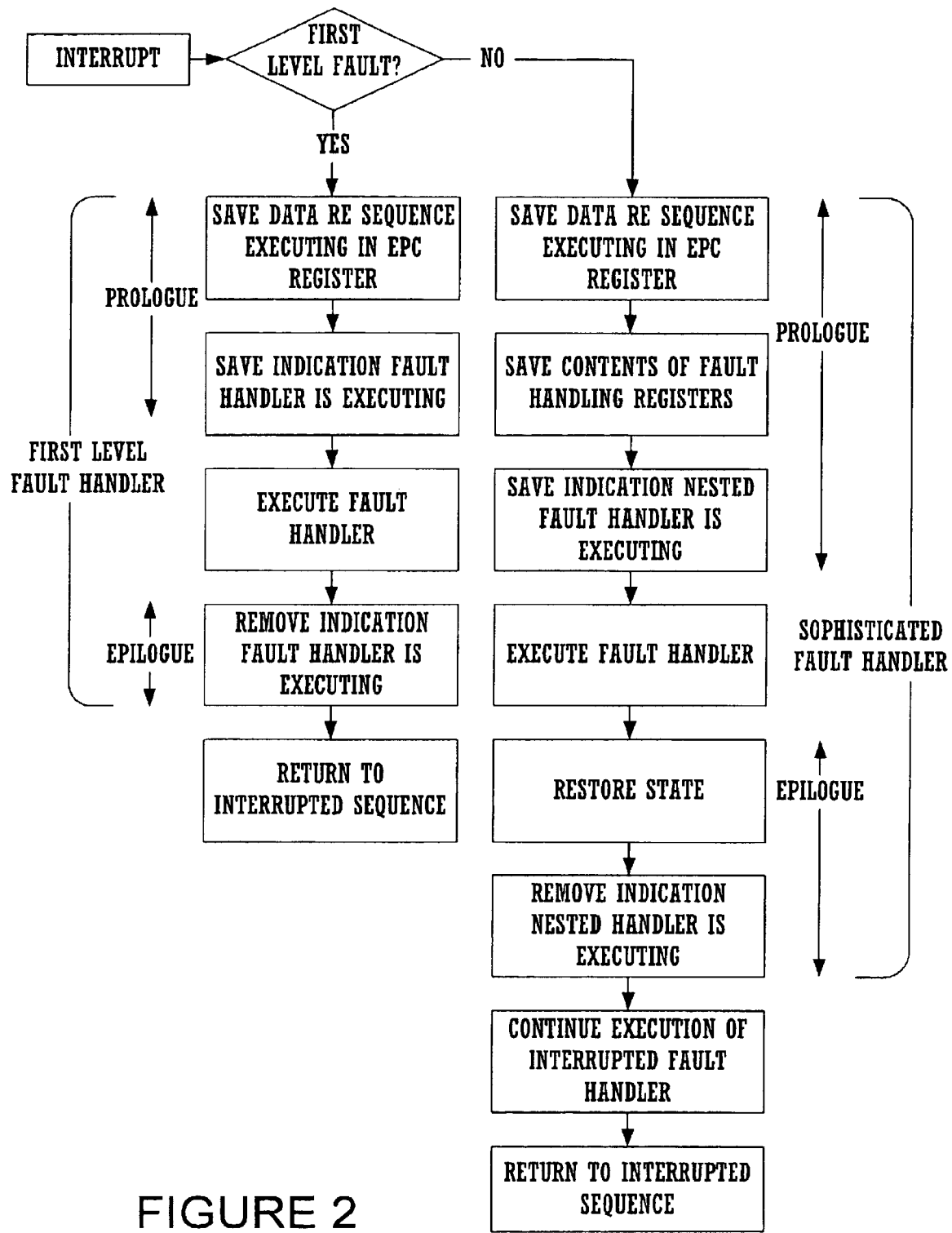
FIG. 2 is a flow chart illustrating a method in accordance with a first embodiment of the invention.

In a first embodiment of the invention illustrated in the flow chart of FIG. 2, two different software fault handlers are provided for every fault which might be subject to a nested fault. The two fault handlers are of different degrees of sophistication. In each situation in which a first level fault occurs, the least sophisticated fault handler is used. This fault handler saves only sufficient state to allow the processor to return to the sequence of instructions which was interrupted or otherwise handle the first level fault. The state saved includes no additional state which would allow a nested fault to be handled. However, when any first level fault handler is invoked, along with the minimal state, an indication is saved in hardware that the processor is executing a fault handler. In one particular embodiment, the indication is a single bit 15 which is placed in a first condition in an exception information and status register (EISR) 16 illustrated in FIG. 1 (or other storage media). If a nested fault occurs while executing the first level fault, the processor checks the indication (bit 15) and determines that this is a nested fault. This determination causes the processor or code running on the processor to stop processing the first level fault using the less sophisticated fault handler, return to a previous point in processing (e.g., the beginning of the fault handling process), and branch to the more sophisticated fault handler for the particular fault. The more sophisticated fault handler then provides a process which allows both the first level fault and the cause of the nested fault to be handled.

To do this, the more sophisticated fault handler may include or cooperate with a prologue sequence which stores sufficient state before recommencing processing of the first level fault so that any nested fault which might occur during the processing of the first level fault can be handled. Thus, the content of the error program control register 10 and of the fault handling registers 12 and 14 when the first level, fault is interrupted are stored before the fault handling portion is itself executed.

Alternatively, the more sophisticated fault handler may return to an earlier point in the sequence of instructions which was interrupted to handle the first level fault, reorder execution of the sequence of instructions which was interrupted in a manner that the nested fault no longer occurs, and then handle the first level fault to completion.

This first embodiment of the invention offers a number of advantages. First, invoking only a minimal fault handler for any first level fault reduces the time required to execute fault handlers in situations which, in fact, do not generate nested faults. Second, providing more complicated nested fault handlers which either include or are associated with prologue code to handle all situations in which nested faults do occur allows nested faults to be handled expeditiously.

This first embodiment is especially useful when practiced by a processor such as that described in U.S. Pat. No. 6,031,992 issued Aug. 29, 1999, to R. Cmelik et al. Such a processor translates instructions from an external instruction set to a host instruction set and includes hardware which temporarily stores the effects generated by execution of sequences of instructions until the sequence has completed executing without generating a fault. If no fault occurs, the effects are stored in memory and processing continues. If a fault occurs, the processor reverts to a previous point in the instruction sequence at which correct state exists and discards the effects of the execution. The process by which the processor reverts to a previous point in execution if a fault occurs is especially useful for switching from a first level fault handler to a nested fault handler.

Figure 3:
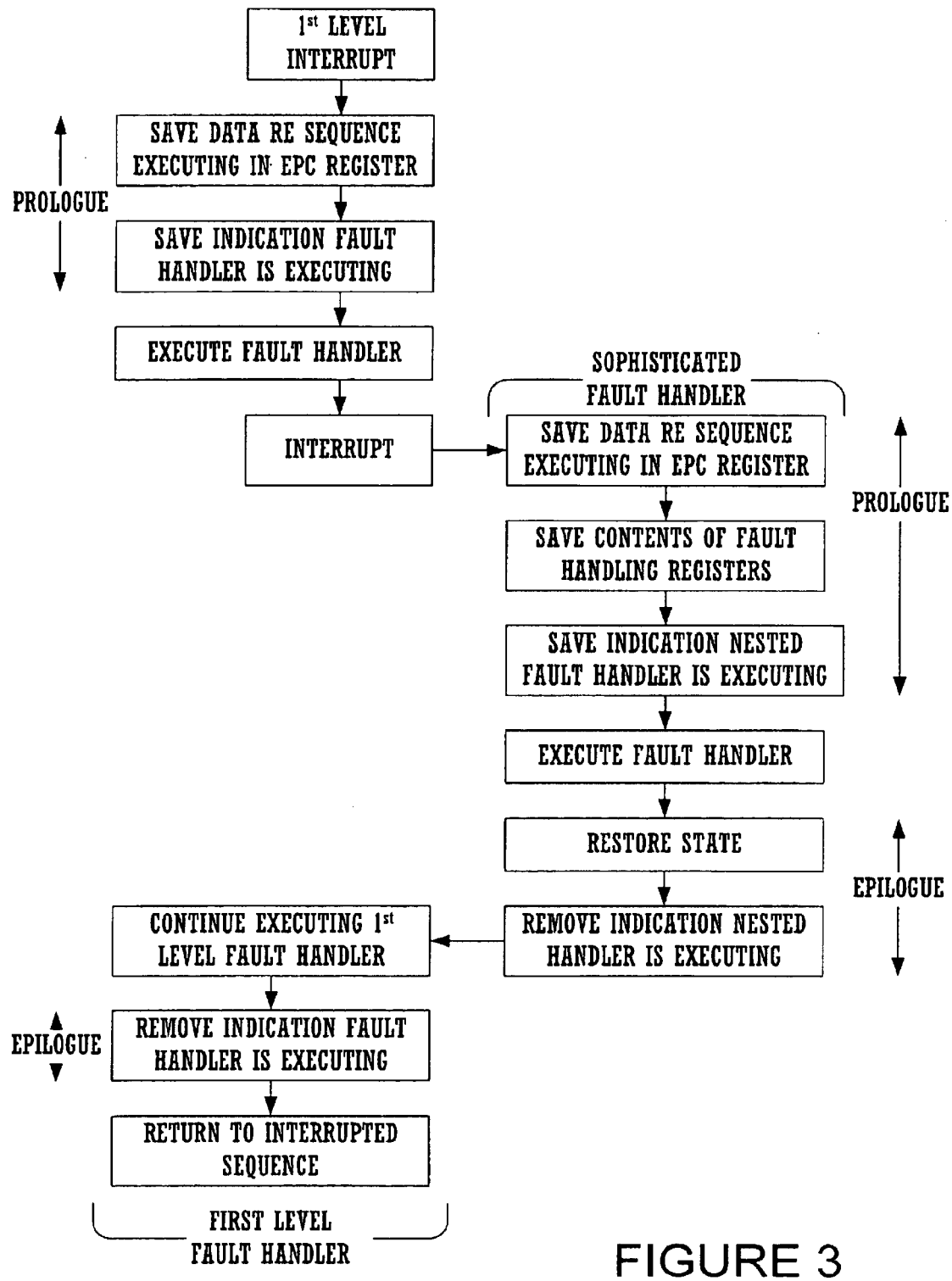
FIG. 3 is a flow chart illustrating a method in accordance with a second embodiment of the invention.

Another embodiment of the invention is illustrated in FIG. 3. In this embodiment, two fault handlers are again provided for each fault which might itself be interrupted by a nested fault. However, in contrast to responding to a nested fault by reverting to the beginning of the less sophisticated first level handler, eliminating the results that fault handler previously generated, and running a more sophisticated handler to handle both the first level fault and nested faults, this second embodiment utilizes a prologue sequence as a part of the more sophisticated handler (or simply placed before a fault handler which also handles first level faults) that stores state sufficient to execute nested faults prior to executing the nested fault handler.

The choice of whether the prologue sequence is a separate sequence or a preliminary portion of the fault handler itself depends on the whether memory or speed is more important. A more sophisticated fault handler comprising the same fault handlers as are used for first level faults and a single sequence of prologue code which may be executed before any fault handler requires significantly less memory but executes somewhat more slowly. Separating the prologue and epilogue from the more sophisticated handlers allows the same instructions to be used for both first level and nested handlers so that less space is required for the actual handling code. However, this means that the prologue and epilogue cannot be scheduled with the execution of each handler and that the prologue cannot be tailored to a single handler but must functions with a plurality of handlers; consequently, execution takes longer. On the other hand, making the prologue and epilogue code an integral part of each handler replicates these portions of the code and requires individual handling code for first level and nested handlers thereby requiring significantly more space.

As may be seen from the figure, the prologue sequence causes the values in the fault handling registers and the error program control register to be stored before executing the fault handler code. One particular embodiment utilizes a second error program register 10a to store state. By utilizing two error program registers, state regarding the two interrupted sequences which must be recorded for handling both levels of faults may be stored. In one embodiment, this is accomplished by writing the state in the register 10 to the register 10a and recording the state of the interrupted fault handler sequence in register 10. Once the additional state has been stored, the nested fault handler may be started without repeating the steps of the first level fault handler carried out before interruption. This accelerates the process of handling a nested fault. Having two copies of a resource also eliminates the need to have N copies of a resource to support N levels of nesting.

The nested fault handler also includes (or cooperates with) an epilogue portion which is executed after the nested fault handler to restore the values in the error program control register and the fault handling registers before returning to the first level fault handler from the nested fault handler. This epilogue code assures that the first level fault handler begins at the correct address and that the state of the first level fault handler is correct before its execution continues.

In order to handle nested faults within nested faults, state relating to each level of nested fault is also stored and restored when the fault handler has completed. This may be done by duplicating hardware such as the registers 10, 12, and 14 or by storing the state in memory (e.g., cache memory which may be rapidly accessed). In any case, the method proceeds in the manner described for the nested fault process in either FIG. 2 or FIG. 3.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What Is claimed Is:

1. A method for processing nested faults comprising:
   determining whether a fault is a first level fault;
   responding to a determination of a first level fault with a first fault handler and saving a first amount of state sufficient to handle a first level fault; and
   responding to a determination of a nested fault with a second fault handler and saving an additional amount of state before handling the nested fault, wherein said second fault handler supercedes said first fault handler and processes said first level fault and said nested fault.

2. A method as claimed in claim 1 in which the step of determining whether a fault is a first level fault comprises storing an indication when a first level fault handler is executed, and determining if an indication has been stored when a nested fault handler is executed.

3. A method as claimed in claim 1 further including the steps of executing a first level fault handler after saving a first amount of state sufficient to handle a first level fault, and executing a different fault handler after saving an additional amount of state before handling the nested fault.

4. A method as claimed in claim 3 further including the steps of executing epilogue sequences of instructions after handling any fault handler enabling return of execution to a correct sequence of instructions following a fault last handled.

5. A fault handler system comprising:
   a first fault determiner for determining whether a fault is a first level fault;
   a first fault handler for responding to a determination of a first level fault by saving a first amount of state sufficient to handle a first level fault; and
   a second fault handler for responding to a determination of a nested fault by saving an additional amount of state before handling the nested fault, wherein said second fault handler supercedes said first fault handler and processes said first level fault and said nested fault.

6. A fault handler system as claimed in claim 5 in which said first fault determiner includes storage media for holding an indication that a processor is handling a fault, and means for detecting the condition of the storage media.

7. A fault handler system as claimed in claim 6 in which the storage media is a processor register.

8. A fault handler system as claimed in claim 6 in which the means for detecting the condition of the storage media includes software running on the processor.

9. A fault handler system as claimed in claim 5 in which said second fault handler includes a second set of fault handling registers in addition to a first set of fault handling registers.

10. A method for processing a nested fault comprising:
    detecting a first fault;
    storing a first amount of state associated with said first fault;
    invoking a first fault handler to process said first fault;
    detecting a nested fault;
    storing a second amount of state associated with said nested fault,
    wherein said second amount of state is greater than said first amount of state; and
    invoking a second fault handler to process said nested fault wherein said second fault handler supercedes said first fault handler and processes said first fault and said nested fault.

11. The method as recited in claim 10 further comprising generating an indicator in response to invoking said first fault handler.

12. The method as recited in claim 11 further comprising storing said indicator in hardware.

13. The method as recited in claim 10 wherein said detecting said nested fault comprises detecting an indicator bit associated with said detecting said first fault.

14. The method as recited in claim 10 further comprising processing said first fault and said nested fault on said second fault handler in response to detecting said nested fault.

* * * * *